(12) United States Patent
Dror (10) Patent No.: US 12,101,240 B2
(45) Date of Patent: *Sep. 24, 2024

(54) DYNAMIC ONE-STEP/TWO-STEP TIMESTAMPING PER PACKET IN NETWORK DEVICES

(71) Applicant: Marvell Israel (M.I.S.L) Ltd., Yokneam (IL)

(72) Inventor: Nitzan Dror, Ramot Hashavim (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/976,658

(22) Filed: Oct. 28, 2022

(65) Prior Publication Data

US 2023/0269161 A1  Aug. 24, 2023

Related U.S. Application Data

(60) Provisional application No. 63/313,756, filed on Feb. 25, 2022, provisional application No. 63/313,293, filed on Feb. 24, 2022.

(51) Int. Cl.
*H04L 43/106* (2022.01)
*H04L 43/067* (2022.01)

(52) U.S. Cl.
CPC ......... *H04L 43/106* (2013.01); *H04L 43/067* (2013.01)

(58) Field of Classification Search
CPC ............................ H04L 43/067; H04L 43/106
See application file for complete search history.

(56) References Cited

U.S. PATENT DOCUMENTS 8,976,750 B1  3/2015  Pearson et al.
9,356,721 B2  5/2016  Haulin
(Continued)

FOREIGN PATENT DOCUMENTS

CN  112887045    *  6/2021
CN  112887045 A  *  6/2021  ............ H04J 3/0667
(Continued)

OTHER PUBLICATIONS

International Search Report and Written Opinion for PCT Patent Application No. PCT/US2023/013877, mailed Jun. 16, 2023. (14 pages).

(Continued)

*Primary Examiner* — Aftab N. Khan
*Assistant Examiner* — Patrick F Ngankam (57) ABSTRACT

A network device determines whether a one-step timestamping method or a two-step timestamping method is to be used for transmission of a first packet. A first processor of the network device transfers to a second processor of the network device, i) a timing message to be included in the first packet, and ii) information that indicates the determined timestamping method. In response to the information from the first processor indicating that the one-step timestamping method is to be used, the second processor transmits the first packet with timing information embedded in the first packet. In response to the information from the first processor indicating that the two-step timestamping method is to be used, the second processor stores the timing information in a memory of the network device for subsequent inclusion in a second packet that is to be transmitted after transmitting the first packet, and transmits the first packet.

20 Claims, 4 Drawing Sheets

(56) References Cited

U.S. PATENT DOCUMENTS

| | | |
|---|---|---|
| 9,391,728 B2 | 7/2016 | Haulin |
| 9,929,928 B1* | 3/2018 | Dekoos ................ H04L 41/147 |
| 10,084,559 B1* | 9/2018 | Devineni .............. H04J 3/0661 |
| 2002/0021717 A1 | 2/2002 | Hedayat et al. |
| 2002/0039370 A1 | 4/2002 | Elliot |
| 2003/0235216 A1 | 12/2003 | Gustin |
| 2004/0008973 A1 | 1/2004 | Marshall et al. |
| 2004/0141526 A1 | 7/2004 | Balasubramanian et al. |
| 2005/0286507 A1 | 12/2005 | Oesterling et al. |
| 2006/0164902 A1 | 7/2006 | Fung |
| 2007/0260906 A1 | 11/2007 | Corredoura |
| 2008/0273521 A1 | 11/2008 | Shao et al. |
| 2009/0310729 A1 | 12/2009 | Liu et al. |
| 2010/0162265 A1 | 6/2010 | Heddes |
| 2010/0223399 A1 | 9/2010 | Kim et al. |
| 2011/0228768 A1 | 9/2011 | Gelter et al. |
| 2012/0014377 A1 | 1/2012 | Joergensen et al. |
| 2013/0003757 A1 | 1/2013 | Boatright et al. |
| 2013/0208735 A1 | 8/2013 | Mizrahi et al. |
| 2013/0343409 A1 | 12/2013 | Haulin |
| 2014/0092918 A1 | 4/2014 | Jost |
| 2014/0153588 A1 | 6/2014 | Haulin |
| 2015/0333856 A1 | 11/2015 | Hayter et al. |
| 2016/0142329 A1* | 5/2016 | Sasak ................. H04L 47/6245 370/413 |
| 2016/0294536 A1 | 10/2016 | Biederman |
| 2021/0297230 A1 | 9/2021 | Dror et al. |

FOREIGN PATENT DOCUMENTS

| | | |
|---|---|---|
| DE | 102008026391 A1 | 12/2009 |
| EP | 2254267 A1 | 11/2010 |
| EP | 3840255 A1 | 6/2021 |
| WO | 2012065823 A1 | 5/2012 |
| WO | 2013117997 A2 | 8/2013 |
| WO | 2016070947 A1 | 5/2016 |

OTHER PUBLICATIONS

International Search Report and Written Opinion for PCT Patent Application No. PCT/IB2023/051754, mailed Jun. 2, 2023. (15 pages).

"LAN8814—4-Port Gigabit Ethernet Transceiver with QSGMII/Q-USGMII, IEEE 1588, SyncE and TSN Support," Microchip Technology Inc., 108 pages, Feb. 1, 2022.

Non-Final Office Action for Application No. 18/114, 170, mailed Nov. 8, 2023. (30 pages).

Non-Final Office Action for Application No. 18/114, 171, mailed Oct. 27, 2023. (18 pages).

Notice of Allowance for U.S. Appl. No. 18/114,170, mailed Apr. 18, 2024. (10 pages).

Notice of Allowance for U.S. Appl. No. 18/114,171, mailed Apr. 18, 2024. (10 pages).

* cited by examiner

| Packet Type 302 | SubPort Id 304 | Extension Field Type 306 | Extension Field 308 | CRC 310 |

| Packet Type 302 | SubPort Id 304 | Extension Field Type 306 | Extension Field 308 | CRC 310 |

Timestamp 344

| Packet Type 302 | SubPort Id 304 | Extension Field Type 306 | Extension Field 308 | CRC 310 |

Timestamping type 374 indicates whether 1-step or 2-step time-stamping is to be performed for the packet 152

DYNAMIC ONE-STEP/TWO-STEP TIMESTAMPING PER PACKET IN NETWORK DEVICES

CROSS REFERENCES TO RELATED APPLICATIONS

This application claims the benefit of U.S. Provisional Patent App. No. 63/313,293, entitled "Dynamic 1/2 Step Timestamping in MCH Based PHY," filed on Feb. 24, 2022, the disclosure of which is hereby expressly incorporated herein by reference in its entirety. This application also claims the benefit of U.S. Provisional Patent App. No. 63/313,756, entitled "Encrypted PTP Frames 1 Step Timestamping over USXGMII/USGMII Interfaces," filed on Feb. 25, 2022.

FIELD OF TECHNOLOGY

The present disclosure relates generally to communication networks, and more particularly to timestamping packets in a network device.

BACKGROUND

Clock synchronization protocols, such as the Precision Time Protocol (PTP), are commonly used in packet-based networks to synchronize clocks maintained at different network devices across a computer network. In such clock synchronization protocols, a first network device, which maintains a master clock, transmits a timing packet to a second network device, which maintains a slave clock. The first network device also transmits to the second network device a transmit timestamp that indicates when the first network device transmitted the timing packet. The second network device utilizes the transmit timestamp corresponding to the timing packet and an estimated network latency to adjust the slave clock in order to synchronize the slave clock with the master clock.

In a technique often referred to as "one-step timestamping," the first network device includes the transmit timestamp in the timing packet itself. Some one-step timestamping implementations involve hardware that is capable of embedding the transmit timestamp in the timing packet just prior to the first network device transmitting the timing packet so that the value of the transmit timestamp in the timing packet is very close to the actual time at which the timing packet was transmitted. Some one-step timestamping implementations increase hardware requirements, cost, and/or power consumption in network devices because a network device typically needs to perform parsing and timing computation operations with respect to packets at wire speed in order to embed timestamps or other timing information into timing packets on-the-fly as the timing packets are transmitted from the network device.

In a technique often referred to as "two-step timestamping," the first network device generates the transmit timestamp in connection with transmitting the timing packet, stores the transmit timestamp in a register, but does not include the transmit timestamp in the timing packet itself. Rather, the first network device includes the transmit timestamp corresponding to transmission time of the timing packet in a follow-up packet. Because the transmit timestamp is transmitted in a follow-up packet, two-step timestamping systems do not require "on-the fly" hardware that embeds the transmit timestamp into the timing packet itself. However, latency associated with the timing packets is increased because the second communication device cannot determine the transmit time of the timing packet until receiving the follow-up packet, which may reduce end-to-end accuracy of clocks in a network. Also, two-step timestamping requires the follow-up packet to be matched with a corresponding timing packet at the second network device, which increases implementation complexity and sometimes leads to synchronization errors when matching is performed incorrectly. Additionally, two-step timestamping requires transmission of additional packets, which increases overhead.

SUMMARY

In an embodiment, a network device is configured to operate in a communication network and comprises: a first processor, a second processor, and a memory included in or coupled to the second processor. The first processor is configured to: determine a timestamping method for communicating timing information corresponding to transmission of a first packet by the network device to a receiving device, wherein the timestamping method determined by the controller is selected from a set of multiple timestamping methods that a second processor of the network device is configured to perform, the set of multiple timestamping methods including: i) a one-step timestamping method, and ii) a two-step timestamping method; and transfer, to the second processor of the network device, i) a timing message corresponding to the first packet, and ii) information that indicates the timestamping method determined by the first processor. The second processor is configured to: determine which timestamping method is to be performed by the second processor based on analyzing the information that indicates the timestamping method determined by the first processor; and transmit the first packet from the network device. The second processor includes a timestamping engine configured to: determine the timing information corresponding to the transmission of the first packet by the network device to the receiving device; in response to the second processor determining that the timestamping method is the one-step method, embed the timing information in the first packet; and in response to the second processor determining that the timestamping method is the two-step method, store the timing information in the memory for subsequent inclusion in a second packet that is to be transmitted by the network device after transmitting the first packet.

In another embodiment, a method for processing timing packets in a network device includes: determining, at a first processor of the network device, a timestamping method for communicating timing information corresponding to transmission of a first packet by the network device to a receiving device, wherein the timestamping method determined by the controller is selected from a set of multiple timestamping methods that a second processor of the network device is configured to perform, the set of multiple timestamping methods including: i) a one-step timestamping method, and ii) a two-step timestamping method; transferring, from the first processor to the second processor of the network device, i) a timing message corresponding to the first packet, and ii) information that indicates the timestamping method determined by the first processor; determining, at the second processor, which timestamping method is to be performed by the second processor based on analyzing the information that indicates the timestamping method determined by the first processor; determining, at the second processor, the timing information corresponding to the transmission of the first packet by the network device to the receiving device; in response to determining, at the second processor, that the timestamping method is the one-step method, embedding, at the second processor, the timing information in the first packet; in response to determining, at the second processor, that the timestamping method is the two-step method, storing the timing information in a memory of the network device for subsequent inclusion in a second packet that is to be transmitted by the network device after transmitting the first packet; and transmitting the first packet from the network device.

DETAILED DESCRIPTION

The IEEE 802.1AS Standard is a profile of the Precision Time Protocol (PTP) for use with Audio Video Bridging (AVB) and Time-Sensitive Networking (TSN). The IEEE 802.1AS Standard requires that some timing packets (e.g., peer-to-peer delay messages) shall utilize 2-step timestamping while other timing packets (e.g., sync messages) may use either 1-step timestamping or 2-step timestamping.

In embodiments described below, a network device selectively performs 1-step timestamping or 2-step timestamping on a per packet basis. In some such embodiments, the network device performs 2-step timestamping on timing packets that a protocol (e.g., the protocol defined by the IEEE 802.1AS Standard or another suitable protocol) requires use of 2-step timestamping, and performs 1-step timestamping on timing packets that the protocol permits or requires use of 1-step timestamping. In some embodiments described below, a lower-level processor of the network device is configured to perform both 1-step timestamping and 2-step timestamping, and a higher-level processor is configured to, for each of at least some packets for which transmit timestamps are to be generated, instruct the lower-level processor to selectively perform either 1-step timestamping or 2-step timestamping for the particular packet. In some embodiments, the higher-level processor generates a control header associated with a timing packet, the control header having an indication of whether 1-step timestamping or 2-step timestamping is to be performed for the timing packet, and the higher-level processor provides the control header to the lower-level processor in connection with the timing packet. The lower-level processor analyzes the control header and selectively performs either 1-step timestamping or 2-step timestamping for the timing packet in accordance with the indication in the control header of whether 1-step timestamping or 2-step timestamping is to be performed for the timing packet.

Figure 1:
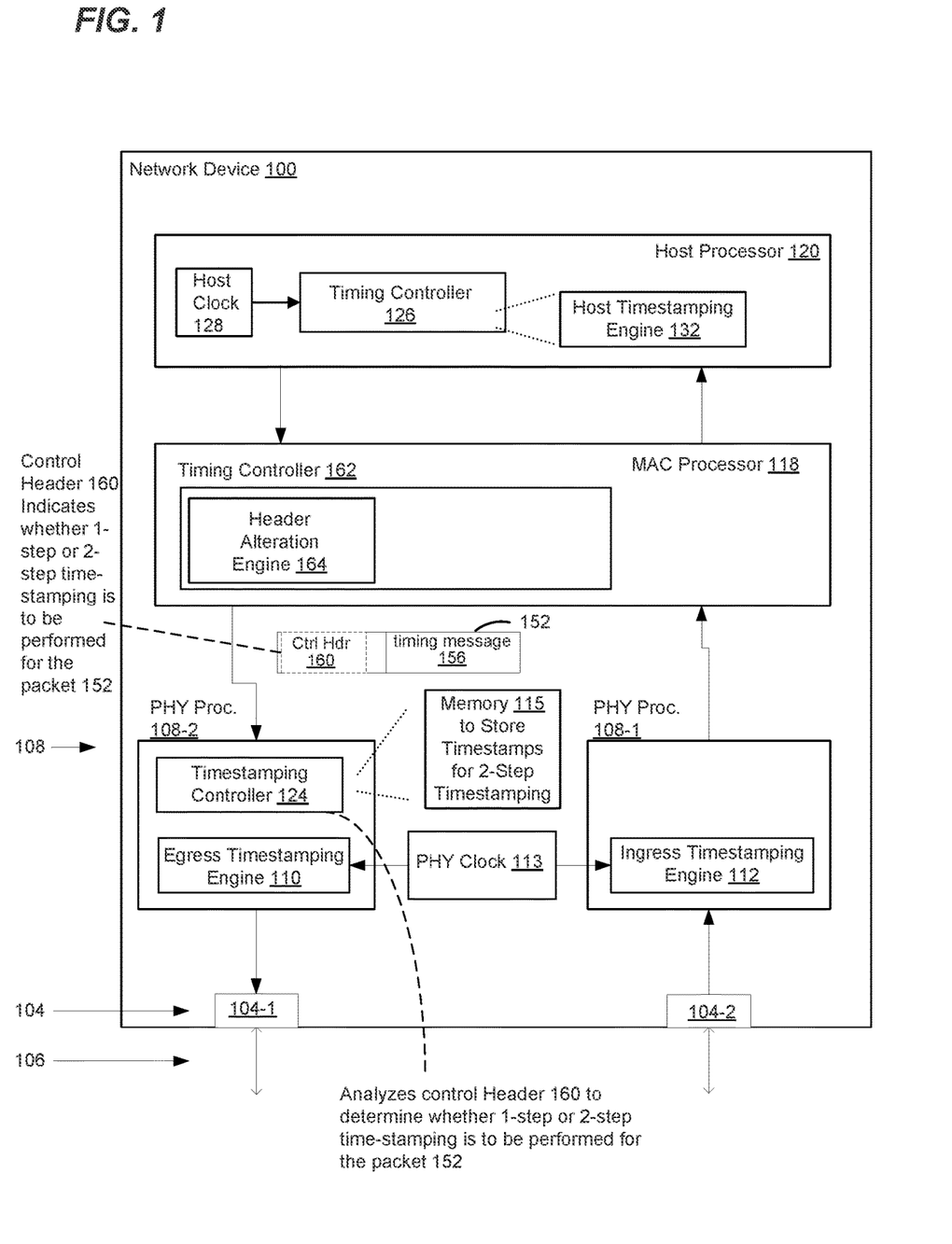
FIG. 1 is a simplified block diagram of an example network device configured to dynamically perform one-step timestamping or two-step timestamping on a per-packet basis, according to an embodiment.

FIG. 1 is a block diagram of an example network device 100 configured to transmit timestamped packets in a network to allow one or more other devices to synchronize with a master clock in the network, according to an embodiment. The network device 100 is configured to operate according to a synchronization protocol for timing synchronization. In an embodiment, the network device 100 is configured to operate according to the Institute of Electrical and Electronics Engineers (IEEE) 802.1AS Standard. In another embodiment, the network device 100 is configured to operate according to another synchronization protocol, such as the IEEE 1588 standard, commonly referred to as the "Precision Time Protocol" or "PTP," the network time protocol (NTP), or another suitable synchronization protocol.

The network device 100 is configured to operate as an endpoint device that implements a master clock or a slave clock on the network, or a relay device that relays the master clock to one or more endpoint devices on the network, in various embodiments in which the network device 100 operates according to the IEEE 802.1AS Standard. Generally, the network device 100 is configured to generate timing packets and/or update timing information in received timing packets, and transmit the timing packets to the one or more other devices on the network to allow the one or more other devices to synchronize with the master clock on the network, in various embodiments. As used herein, the term "timing packets" refers to network data packets that include timing messages generated and transmitted by network devices in a network and used for conducting time related procedures in the network, such as clock synchronization between network devices in the network.

The network device 100 includes one or more network ports 104 configured to couple to respective one or more network links 106 for coupling the network device 100 to one or more other devices in a network. The network device 100 also includes one or more physical layer (PHY) processors 108 coupled to the one or more network ports 104, in an embodiment. Although the network device 100 is illustrated in FIG. 1 as having a respective PHY processor 108 coupled to a respective network port 104, the network device 100 includes a PHY processor 108 that is coupled to multiple (e.g., all) network ports 104, in some embodiments. In another embodiment, the network device 100 is a single port device that includes only a single PHY processor 108 coupled to a single port 104. The one or more PHY processors 108 are sometimes referred to herein as "the PHY processor 108" for brevity.

In various embodiments, the PHY processor 108 includes one of, or any suitable combination of two or more of, a digital-to-analog converter (DAC), an amplifier, a modulator, etc. (not shown), to convert a digital signal corresponding to a packet to an analog signal suitable for transmission via the communication link 106. The PHY processor 108 also includes timing-related circuitry that implement timing synchronization operations. For example, a PHY processor 108-1 includes an egress timestamping engine 110, and a PHY processor 108-2 includes an ingress timestamping engine 112, in an embodiment. The egress timestamping engine 110 of the PHY processor 108-1 is configured to i) generate timing information based on a clock maintained by a PHY clock 113, the timing information corresponding to transmission times of the timing packets from the network device 100, and ii) selectively, on a per-packet basis, a) embed the timing information into the timing packet itself, or ii) store the timing information in a memory 115, in an embodiment. In an embodiment, embedding the timing information in the timing packets themselves corresponds to one-step timestamping, and storing the timing information int the memory 115 corresponds to two-step timestamping.

The ingress timestamping engine 112 of the PHY processor 108-2 is configured to generate timestamps for received timing packets based on the clock maintained by the PHY clock 113, the timestamps corresponding to receipt time of timing packets by the network device 100, in an embodiment. In another embodiment, the PHY processor 108-1 and the PHY processor 108-2 are independent entities that maintain respective PHY clocks 113. In some such embodiment, a suitable clock synchronization mechanism is employed to synchronize the respective PHY clocks 113. In an embodiment in which the PHY processor 108-1 and the PHY processor 108-2 maintain respective PHY clocks 113, the network device 100 includes a common oscillator (not shown) that is used to drive the respective PHY clocks 113.

The egress timestamping engine 110 and the ingress timestamping engine 112 are implemented in hardware configured to perform on-the-fly operations at wire speed, in an embodiment. For example, in an embodiment, the egress timestamping engine 110 of the PHY processor 108-1 is configured to generate timing information corresponding to a transmission time of a packet on-the-fly as the packet is being transmitted by the network device 100 and, when one-step timestamping is to be performed, embed the timing information in the packet as the packet is transmitted from the network device 100. The ingress timestamping engine 112 is configured to generate a timestamp for a packet on-the-fly as the packet is received by the network device 100, in an embodiment. Although the PHY processor 108-1 is illustrated in FIG. 1 as including an egress timestamping engine, and the PHY processor 108-2 is illustrated in FIG. 1 as including an ingress timestamping engine, a PHY processor 108 includes both an egress timestamping engine configured to generate timing information for packets transmitted from the network device 100 and an ingress timestamping engine configured to generate timestamps for packets received by the network device 100, in an embodiment.

The network device 100 also includes a media access control (MAC) processor 118 and a host processor 120, in an embodiment. The MAC processor 118 is implemented using one more integrated circuits (e.g., one or more application-specific integrated circuits (ASICs)), in an embodiment. In an embodiment, the host processor 120 is, or is implemented by, a processing unit, such as a central processing unit (CPU) of the network device 100. In an embodiment, the host processor 120 is configured to implement computer readable instructions stored in a memory (not shown) of the network device 100. The MAC processor 118 is coupled to the one or more PHY processors 108 and the host processor 120. The MAC processor is configured to receive packets from the one or more PHY processors 108, to perform MAC operations with respect to the packet received from the one or more PHY processors 108, e.g., to parse and de-capsulate the packets, and to transfer the packets to the host processor 120 for further processing, in an embodiment. The MAC processor 118 is also configured to receive messages from the host processor 120, to perform MAC operations with respect to the messages received from the host processor 120, e.g., to encapsulate the messages with one or more protocol headers to generate packets, and to transfer the packets to appropriate one or more PHY processors 108 for transmission from the network device 100, in an embodiment. As will be discussed in more detail below, the MAC processor 118 is configured to perform initial processing of timing packets and to provide, to a PHY processor (e.g., the PHY processor 108-2), control headers containing information that indicates whether the PHY processor 108 is to use one-step timestamping or two-step timestamping with corresponding timing packets, in some embodiments.

In an embodiment and/or scenario in which the network device 100 is operating as an endpoint device, the host processor 120 is configured to generate timing messages originating from the network device 100. In an embodiment, the network device 100 includes or implements a timing controller 126 configured to generate timing messages for transmission from the network device 100. In an embodiment, the timing controller 126 is configured to generate PTP messages, such as PTP synchronization (Sync) messages, PTP delay request (Pdelay-Req) messages, PTP peer-to-peer delay response (Pdelay-Resp) messages, etc., in some embodiments. The timing controller 126 is configured to generate other suitable types of timing message, in other embodiments.

In some embodiments, the timing controller 126 is configured to determine, in connection with timing messages generated by the timing controller 126, whether one-step timestamping or two-step timestamping is to be used for each of at least some of the timing messages. For instance, the network device 100 is configured to use one-step timestamping with a first set of one or more types of timing messages and to use two-step timestamping with a second set of one or more types of timing messages, according to an embodiment. As merely an illustrative example, the first set of one or more types of timing messages includes PTP sync messages, and the second set of one or more types of timing messages includes Pdelay-Resp messages. Thus, in some embodiments, the timing controller 126 is configured to, in connection with a timing packet generated by the timing controller 126, determine whether one-step timestamping or two-step timestamping is to be used for the timing packet based on a message type of a timing message. For example, the timing controller 126 is configured to determine that one-step timestamping is to be used if the message type of the timing message is in a first set of one or more types of timing messages, and to determine that two-step timestamping is to be used if the message type of the timing message is in a second set of one or more types of timing messages, according to an embodiment. In other embodiments, the timing controller 126 is configured to, in connection with a timing message generated by the timing controller 126, determine whether one-step timestamping or two-step timestamping is to be used for the timing messages additionally or alternatively based on one or more other suitable criteria.

In an embodiment, when a timing message is to be transmitted using one-step timestamping, the timing controller 126 is configured to generate the timing message to include initial timing information indicative of a transmission time of the timing packet. The initial timing information is determined based on a host clock 128 maintained by the host processor 120, in an embodiment. In an embodiment, the timing controller 126 is configured to set a timestamp field in a timing message generated by the timing controller 126 to a current value of a host clock 128 maintained by the host processor 120. The timing controller 126 is further configured to set a correction field in the timing message to an initial correction value for compensating the current value of the host clock 128 for a transmission delay expected to be experienced by the timing packet between the current time and the time that the timing packet is actually transmitted from the network device 100. In an embodiment, the timing controller 126 includes a timestamping engine 132 that is configured to set the timestamp field in the timing packet to the current value of the host clock 128. In an embodiment, the timestamping engine 132 is also configured to set the correction field in the timing packet to the initial correction value.

Figure 2:
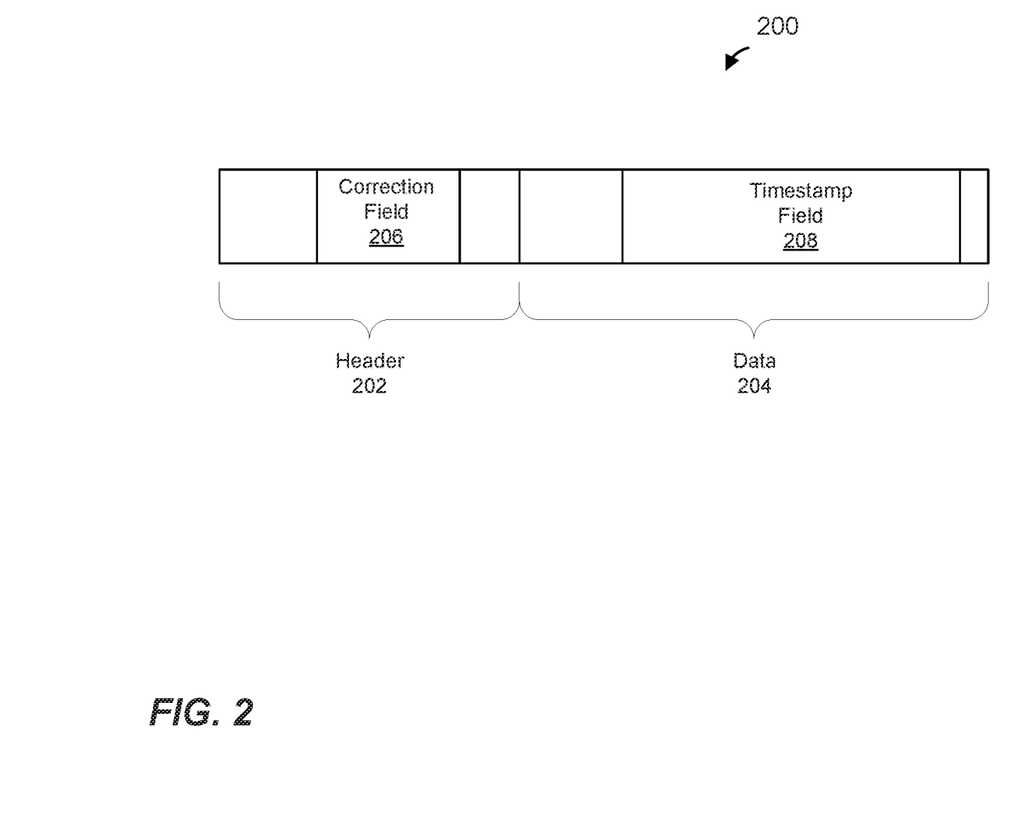
FIG. 2 is a diagram of an example timing message that is processed by the network device of FIG. 1, according to an embodiment.

Referring briefly to FIG. 2, an example timing message 200 corresponds to a timing message generated by the timing controller 126, in an embodiment. The timing message 200 includes a header 202 and a data portion 204. The header 202 includes a correction field 206, in an embodiment. The header field 202 includes one or more other fields in addition to the correction field 206, in some embodiments. The data portion 204 includes a timestamp field 208. In some embodiments, the data portion 204 includes one or more fields in addition to the timestamp field 208.

Referring now to FIGS. 1 and 2, in an embodiment, the timestamping engine 132 is configured to set the timestamp field 208 to the current value of the host clock 128. In an embodiment, the timestamping engine 132 is also configured to set the correction field 206 to the initial correction value.

The host clock 128 used by the host processor 120 to generate the initial timing information for a timing packet is less accurate than the PHY clock 113, in an embodiment. For example, the host clock 128 maintains a time of day with an accuracy within one or several milliseconds, whereas the PHY clock 113 maintains a time of day with an accuracy within one or several nanoseconds, in an embodiment. As will be explained in more detail below, when one-step timestamping is implemented, the correction field (e.g., the correction field 206) of the timing packet is subsequently updated by the egress timestamping engine 110 based on the PHY clock 113 at the time of transmission of the timing packet from the network device 100. Updating the correction field by the PHY processor 108 based on the PHY clock 113 compensates for inaccuracy of the host clock 128, in at least some embodiments.

In an embodiment, when one-step timestamping is to be used, the timing controller 126 generates the correction field value to be equal to the negative value of the nanosecond portion of the timestamp in the timestamp field 208 so that the nanosecond portion of the timestamp can be subsequently updated by a PHY processor 108, based on the PHY clock 113, at a time of transmission of the timing packet 152 from the network device 100. In an embodiment, the timing controller 126 also adds an egress pipeline delay to the correction field value, where the egress pipeline delay is a preconfigured value of static delay from a point which the PHY processor 108 timestamps a timing packet to an egress pin of the PHY processor 108 via which the timing packet is egressed from the PHY processor 108.

In some embodiments, the timing controller 126 encapsulates the timing message in a User Datagram Protocol (UDP) datagram. In some embodiments in which the timing message is encapsulated in a UDP datagram having a checksum field, the timing controller 126 sets the checksum field based on the values of the timestamp field 208 and the correction field 206, to maintain correctness of the checksum field of the UDP datagram.

The host processor 120 is configured to transfer the timing message to the MAC processor 118. In some embodiments, transferring the timing message to the MAC processor 118 includes transferring to the MAC processor 118 a UDP datagram that encapsulates the timing message.

In connection with transferring the timing message to the MAC processor 118, the timing controller 126 is configured to indicate to the MAC processor 118 whether one-step timestamping or two-step timestamping is to be used for the timing message, according to an embodiment. In other embodiments, the timing controller 126 does not indicate to the MAC processor 118 whether one-step timestamping or two-step timestamping is to be used for the timing message. For example, in some embodiments, the MAC processor 118 determines whether one-step timestamping or two-step timestamping is to be used for the timing message without relying on an indication from the host processor 120. For instance, the MAC processor 118 determines a type of the timing message received from the host processor 120, and determines whether one-step timestamping or two-step timestamping is to be used for the timing message based on the determined type of the timing message, according to an embodiment.

The MAC processor 118 is configured to generate a timing packet using the timing message received from the host processor 120, according to an embodiment. The timing packet generated by the MAC processor 118 includes an Ethernet frame. For example, the timing packet is generated as a User Datagram Protocol (UDP) over internet protocol version six (IPv6) packet, in an embodiment. In another embodiment, the timing packet is generated as another suitable type of packet, such as a UDP over internet protocol version four (IPv4), a datalink (L2) layer protocol packet, etc. In an embodiment, the MAC processor 118 encapsulates the timing message from the host processor 120 with one or more protocol headers, tags, etc., to generate the timing packet.

The MAC processor 118 is configured to, in turn transfer, the timing packet to an appropriate PHY processor 108 for transmission of the packet from a network port 104 of the network device 100.

FIG. 1 illustrates the MAC processor 118 transferring a timing packet 152 to the PHY processor 108-2. In an embodiment, the timing packet 152 corresponds to a UDP over IPv6 packet. In another embodiment, the timing packet 152 corresponds to another suitable type of packet, such as a UDP over IPv4, an L2 layer protocol packet, etc.

The timing packet 152 includes a timing message 156. In an embodiment, the timing message 156 is generated by the timing controller 126 of the host processor 120. In an embodiment, the timing message 156 is the timing message 200 of FIG. 2. In other embodiments, the timing message 156 is a suitable timing message different from the timing message 200.

The timing packet 152 also includes a control header 160. As will be discussed further below, the control header 160 includes information indicating whether the timing packet 152 is to be processed using one-step timestamping or using two-step timestamping, in an embodiment.

In an embodiment, the MAC processor 118 includes or implements a timing controller 162 configured to process timing messages for transmission from the network device 100. In an embodiment, the timing controller 162 is configured to process PTP messages, such as PTP Sync messages, Pdelay-Req messages, Pdelay-Resp messages, etc., in some embodiments. The timing controller 126 is configured to generate other suitable types of timing message, in other embodiments.

The timing controller 162 comprises a header alteration engine 164 that is configured to generate control headers, such as the control header 160, for the timing messages received from the host processor 120. The header alteration engine 164 is configured to generate the control header 160 to include information that indicates whether the timing packet 152 is to be processed using one-step timestamping or using two-step timestamping, in an embodiment. For example, the header alteration engine 164 is configured to generate the control header 160 to include a first field having a value that indicates whether the timing packet 152 is to be processed using one-step timestamping or using two-step timestamping. In an embodiment, the header alteration engine 164 sets the first field of the control header 160 to a first value to indicate that the timing packet 152 is to be processed using one-step timestamping, and sets the first field of the control header 160 to a second value to indicate that the timing packet 152 is to be processed using two-step timestamping.

In an embodiment, the header alteration engine 164 is also configured to generate the control header 160 to include other suitable information for use by the PHY processor 108-2 for processing the timing packet 152. For instance, the header alteration engine 164 generates the control header 160 to include in one or more second fields of the control header 160 one or more parameters that indicate to the PHY processor 108-2 that, when one-step timestamping is to be performed, the PHY processor 108-2 is to update timing information in the timing packet 152 and to locate a field in the timing packet 152 in which to embed the timing information update, in an embodiment. In an embodiment, the one or more parameters indicate to the PHY processor at least two of i) that the timing packet 152 includes a type of timing message into which timing information is to be embedded by the PHY processor 108-2, ii) a location of a field in the timing packet 152 at which the timing information is to be embedded into the timing packet 152 by the PHY processor 108-2, and iii) whether timing information in the timing packet needs to be updated by the PHY processor.

In some embodiments, the control header 160 includes one or more additional indicators to facilitate timing information update by the PHY processor 108-2 when one-step timestamping is to be performed. As an example, the one or more additional indicators in the control header 160 include one or more of i) an indicator of a location of the correction field 206 in the timing message 156 in the timing packet 152 to enable the PHY processor 108-2 to locate and update the correction field 206 without parsing the timing packet 152 to determine the location of the correction field 206 in the timing packet 152, ii) an indicator of whether a checksum field is present in the timing message 156 in the timing packet 152, iii) an indicator of time application interface (TAI) domain to be used for embedding timing information into the timing packet 152, and iv) an indicator of whether wraparound needs to be accounted for in connection with embedding the timing information into the timing packet 152. In other embodiments, other suitable indicators are additionally or alternatively provided by the MAC processor 118 to the PHY processor 108-2 to enable the PHY processor 108-2 to efficiently embed timing information into the timing packet 152 on-the-fly as the timing packet 152 is transmitted from the network device 100 when one-step timestamping is to be performed.

In other embodiments, other suitable indicators are additionally or alternatively provided by the MAC processor 118 to the PHY processor 108-2, when one-step timestamping is to be performed, to enable the PHY processor 108-2 to efficiently embed timing information into the timing packet 152 on-the-fly as the timing packet 152 is transmitted from the network device 100.

In other embodiments, one-step timestamping involves embedding in the timing packet 152 a "future timestamp" that corresponds to a transmit time in the future, holding the timing packet 152 until a current time reaches the transmit time, and then releasing the timing packet for transmission at the transmit time (referred to herein as "future timestamping"). Examples of future timestamping methods and apparatuses that may be utilized are disclosed in U.S. Pat. No. 8,644,352, entitled "System and Method for Accurate Time Sampling in Presence of Output Delay," and in U.S. Patent Application Pub. No. 2020/0252320, entitled "Method and Apparatus for Transmit Time Timestamping," which are incorporated by reference herein. In some embodiments in which one-step timestamping involves using a future timestamping technique, the header alteration engine 164 is configured to generate the control header 160 to include an indication of the transmit time in the future at which the timing packet 152 is to be transmitted.

The header alteration engine 164 is configured to generate the control header 160 for the timing packet 152 and append the control header 160 to, or embed the control header 160 into, the timing packet 152, in some embodiments. Example control headers generated for the timing packet 152, in various embodiments, are described in more detail below with reference to FIGS. 3A-3B.

With continued reference to FIG. 1, the MAC processor 118 is configured to transfer the timing packet 152 to an appropriate PHY processor 108 (e.g., the PHY processor 108-2) for transmission of the timing packet 152 from a network port 104 (e.g., the network port 104-2).

The PHY processor 108-2 is configured to receive the timing packet 152 from the MAC processor 118, and to determine, using information in the control header 160, whether i) to perform one-step timestamping on the timing packet 152, or ii) to perform two-step timestamping on the timing packet 152. In an embodiment in which the control header 160 includes the first field discussed above, the timestamping controller 124 of the PHY processor 108-2 is configured to i) determine that one-step timestamping is to be performed in response to determining that the first field of the control header 160 is set to the first value, and ii) determine that two-step timestamping is to be performed in response to determining that the first field of the control header 160 is set to the second value.

In some embodiments, the timestamping controller 124 of the PHY processor 108-2 is configured to determine whether to perform one-step timestamping on the timing packet 152, or to perform two-step timestamping on the timing packet 152 further in response to other information in the control header 160. For example, in some embodiments, the control header 160 further includes information that indicates whether timestamping is to be performed for the packet. In some such embodiments, the timestamping controller 124 is configured to i) determine that one-step timestamping is to be performed in response to determining a) that the first field of the control header 160 is set to the first value, and b) that other information in the control header 160 indicates that timestamping is to be performed for the packet, and ii) determine that two-step timestamping is to be performed in response to determining a) that the first field of the control header 160 is set to the second value, and b) that the other information in the control header 160 indicates that timestamping is to be performed for the packet.

In an embodiment, the egress timestamping engine 110 is configured to, when one-step timestamping is to be performed, embed timing information into the timing packet 152. In an embodiment, because initial timing information is already embedded to the timing packet 152 by the MAC processor 118 or the host processor 118 (when one-step timestamping is to be performed), the PHY processor 108 needs to merely update relevant timing information in the timing packet 152 to indicate the actual transmission time of the timing packet 152 from the network device 100. For example, in an embodiment, the egress timing module 110 is configured to update the correction field value (e.g., in the correction field 206) in the timing message 156 in the timing packet 152 to add to the correction value a current value (e.g., a current nanosecond value) of the PHY clock 113.

In an embodiment, the egress timing module 110 is configured to, when one-step timestamping is to be performed, embed the timing information into the timing packet 152 based on the one or more indicators provided to the PHY processor 108-2 by the MAC processor 118. For example, the egress timing module 110 is configured to update the correction value of the correction field 206 at a location determined by the PHY processor 108-2 based on an indicator of the location of the correction field provided by the MAC processor 118 (e.g., included in the control header 160). As another example, the PHY processor 108-2 is configured to determine, based on an indicator provided by the MAC processor 118, whether a checksum trailer field is present in the timing packet 152 and needs to be updated by the PHY processor 108-2 and, if so, update the checksum trailer field in the timing packet 152, in an embodiment.

Embedding final timing information into the packet 152 by updating timing information already included in the timing packet 152, as performed by the PHY processor 108-1, is less computationally intensive compared to systems that do not embed initial timing information into timing packets by a higher-level processor, such as a MAC processor or a host processor. Also, because relevant indicators for embedding the timing information into the timing packet 152 are provided to the PHY processor 108-2 by the MAC processor 118, the PHY processor 108-2 need not parse the timing packet 152, for example to determine a location of the correction field 206 in the timing message 140 in the timing packet 152 and/or to determine whether a checksum trailer field is present in the timing message 140 in the timing packet 152 and needs to be updated by the PHY processor 108-2, in various embodiments. The PHY processor 108-2 is therefore implemented with reduced hardware, which reduces power consumption, cost, etc., as compared to systems in which a PHY processor is configured to perform on-the-fly one-step timestamping without indicators being provided by a MAC processor and/or without initial timing information being embedded into the timing packets by the MAC processor or by a host processor, in at least some embodiments.

In embodiments in which one-step timestamping involves future timestamping, when one-step timestamping is to be performed, the PHY processor 108-2 holds the timing packet 152 until a current time reaches the transmit time, and then releases the timing packet 152 for transmission at the transmit time. In some embodiments in which the control header 160 includes an indication of the transmit time in the future at which the timing packet 152 is to be transmitted, the PHY processor 108-2 determines the transmit time by retrieving the transmit time from the control header 160.

The egress timestamping engine 110 is configured to, when two-step timestamping is to be performed, store timing information corresponding to the timing packet 152 into the memory 115. In an embodiment, the PHY processor 108-2 subsequently retrieves the timing information from the memory 115 and sends the timing information to the host processor 120 so that the host processor 120 can send the timing information in a follow-up packet. In another embodiment, the host processor 120 subsequently retrieves the timing information from the memory 115 so that the host processor 120 can send the timing information in the follow-up packet.

With continued reference to FIG. 1, in an embodiment and/or a scenario in which the network device 100 is operating as a relay device, a PHY processor 108 is configured to receive a timing packet received by the network device 100 via a first network port 104, generate a receive timestamp for the timing packet that indicates an ingress time of the timing packet, and transfer the timing packet to the MAC processor 118. The MAC processor 118 is configured to process the timing packet, to locate a correction field within the timing packet, and to update the correction field in the timing packet to reflect residence time of the timing packet in the network device 100. The MAC processor 118 is configured to then transfer the timing packet to an appropriate PHY processor 108 for transmission of the timing packet from a second network port 104 of the network device 100.

Referring still to FIGS. 1 and 2, in an embodiment the timing packet 152 is a timing packet received by a PHY processor 108 (e.g., the PHY processor 108-1) from a network port 104 (e.g., the network port 104-1). In an embodiment, when the timing packet 152 is received by the network device 100, the ingress timing module 112 of the PHY processor 108-1 generates a receive timestamp for the timing packet 152, the receive timestamp corresponding to a time of receipt, or an ingress time, of the timing packet 152 by the network device 100. The PHY processor 108-1 then transfers the timing packet 152, along with the receive timestamp generated for the timing packet 152, to the MAC processor 118. In an embodiment, the PHY processor 108-1 generates a control header for the timing packet 152, embeds the timestamp into the control header, and transfers the timing packet 152 with the control header to the MAC processor 118. In an embodiment, the PHY processor 108-1 replaces, with the control header generated for the timing packet 152, a preamble of the timing packet 152, and transfers the timing packet with the control header to the MAC processor 118. In other embodiments, the PHY processor 108-1 transfers the timestamp generated for the timing packet 152 to the MAC processor 118 in other suitable manners.

The timing packet received from the PHY processor 108-1 includes an Ethernet frame. For example, the timing packet is a UDP over IPv6 packet, in an embodiment. In another embodiment, the timing packet is another suitable type of packet, such as a UDP over IPv4, an L2 layer protocol packet, etc.

The MAC processor 118 is configured to determine whether the timing packet received from the PHY processor 108-1 is to be processed using one-step timestamping or two-step timestamping, in an embodiment. For instance, the MAC processor 118 determines a type of a timing message in the timing packet received from the PHY processor 108-1, and determines whether one-step timestamping or two-step timestamping is to be used for the timing packet based on the determined type of the timing message, according to an embodiment. In an embodiment in which the timing packet already includes a control header such as described above, the MAC processor 118 determines whether one-step timestamping or two-step timestamping is to be used for the timing packet based on an indicator (e.g., the first field described above) in the control header 160 that indicates whether one-step timestamping or two-step timestamping is to be used for the timing packet.

In an embodiment, the header alteration engine 164 of the MAC processor 118 is further configured to, at least for timing packets that are to be processed using one-step timestamping, process the timing packets received by the MAC processor 118 from a PHY processor 108 (e.g., the PHY processor 108-1) to locate and update correction fields in timing messages included in the timing packets to indicate residence times of the timing packets in the network device 100. In an embodiment, the header alteration engine 164 is configured to, at least for timing packets that are to be processed using one-step timestamping, process the timing packet 152 received from the PHY processor 108-1, and to locate and update the correction field 206 of the timing message 140 in the timing packet 152 to indicate a residence time of the timing packet 152 in the network device 100. In an embodiment, the header alteration engine 164 is configured to update the correction field 206 of the timing message 140 by subtracting the ingress time of the timing packet 152, indicated by the receive timestamp generated for the timing packet 152 by the PHY processor 108-1, from the current correction value of the correction field 206. In an embodiment, the header alteration engine 164 is configured to also add an egress pipeline delay to the correction field value of the correction field 206, where the egress pipeline delay is a preconfigured value of static delay from a point which the PHY processor 108 timestamps a timing packet to an egress pin of the PHY processor 108 via which the timing packet is egressed from the PHY processor 108.

In an embodiment, when two-step timestamping is to be performed, the MAC processor 118 sends the receive timestamp, which indicates the ingress time of the timing packet 152, to the host processor 120, which uses the receive timestamp to calculate a residence time of the timing packet in the network device 100. With two-step timestamping, the residence time is sent by the network device 100 in a follow-up packet.

In an embodiment in which the timing packet 152 received from the PHY processor 108-1 does not already include the control header 160, the header alteration engine 164 generates the control header 160. The header alteration engine 164 is configured to generate the control header 160 to include information that indicates whether the timing packet 152 is to be processed using one-step timestamping or using two-step timestamping as discussed above, in an embodiment. In an embodiment, the header alteration engine 164 is also configured to generate the control header 160 to include other suitable information for use by the PHY processor 108-2 for processing the timing packet 152 as discussed above.

In an embodiment in which the timing packet 152 received from the PHY processor 108-1 already includes the control header 160, the header alteration engine 164 is configured to modify the control header 160 to include information that indicates whether the timing packet 152 is to be processed using one-step timestamping or using two-step timestamping as discussed above, in an embodiment. In an embodiment, the header alteration engine 164 is also configured to modify the control header 160 to include other suitable information for use by the PHY processor 108-2 for processing the timing packet 152 as discussed above.

With continued reference to FIG. 1, the MAC processor 118 is configured to transfer the timing packet 152 to an appropriate PHY processor 108 (e.g., the PHY processor 108-2) for transmission of the timing packet 152 from a network port 104 (e.g., the network port 104-2).

The PHY processor 108-2 is configured to receive the timing packet 152 from the MAC processor 118, and to determine, using information in the control header 160, whether i) to perform one-step timestamping on the timing packet 152, or ii) to perform two-step timestamping on the timing packet 152. When one-step timestamping is to be performed, the egress timestamping engine 110 updates timing information in the timing packet 152, e.g., updates the correction field 206, in the manner described above to indicate a residence time of the timing packet 152 in the network device, according to an embodiment. In embodiments in which one-step timestamping involves future timestamping, when one-step timestamping is to be performed, the PHY processor 108-2 holds the timing packet 152 until a current time reaches the transmit time, and then releases the timing packet 152 for transmission at the transmit time. When two-step timestamping is to be performed, the egress timestamping engine 110 stores timing information in the memory 115 in the manner described above so that the host processor 120 can use the timing information in the memory 115 to calculate a residence time of the timing packet 152 in the network device. The host processor 120 then sends the residence time in a follow-up packet.

In some embodiments, the PHY processor 108-2 is configured to remove the control header 160 from the timing packet 152 so that the timing packet 152, when transmitted by the PHY processor 108-2, does not include the control header 160.

Figure 3A:
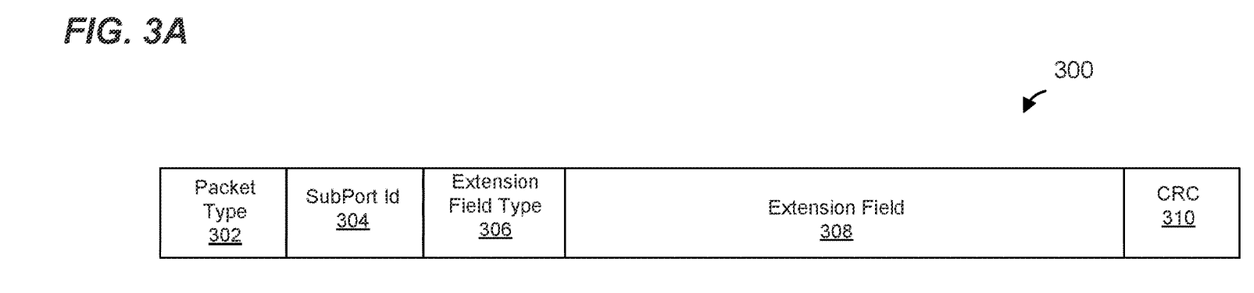
FIGS. 3A-C are diagrams of example control headers of timing messages processed by the network device of FIG. 1, according to various embodiments.

FIG. 3A is a simplified diagram of an example control header 300 that is included in a timing packet, according to an embodiment. The control header 300 is generated by the host processor 120 for a timing message that is to be provided to the MAC processor 118, in an embodiment.

In an embodiment, the control header 300 generally conforms to a known control header format specified for a media independent interface, such as the Universal Serial 10GE Media Independent Interface (USXGMII) or the Universal Serial Gigabit Media Independent Interface (USGMII). However, the control header 300 is modified with respect to known control header format specified for a media independent interface, in an embodiment. The control header 300 includes a packet type field 302, a SubPort Identifier (Id) field 304, and extension field type indicator field 306, an extension field 308 and a cyclic redundancy check (CRC) field 310, in the illustrated embodiment. In various embodiments, the control header 300 omits one or more of the fields 302-310 illustrated in FIG. 3A and/or includes one or more additional fields not illustrated in FIG. 3A.

In an embodiment, the host processor 120 is configured to generate the control header 300 for a timing message that is to be transmitted by the network device 100, and to append the control header 300 to the timing message. In another embodiment, the host processor 120 does not generate the control header 300 and does not append the control header 300 to the timing message.

Figure 3B:
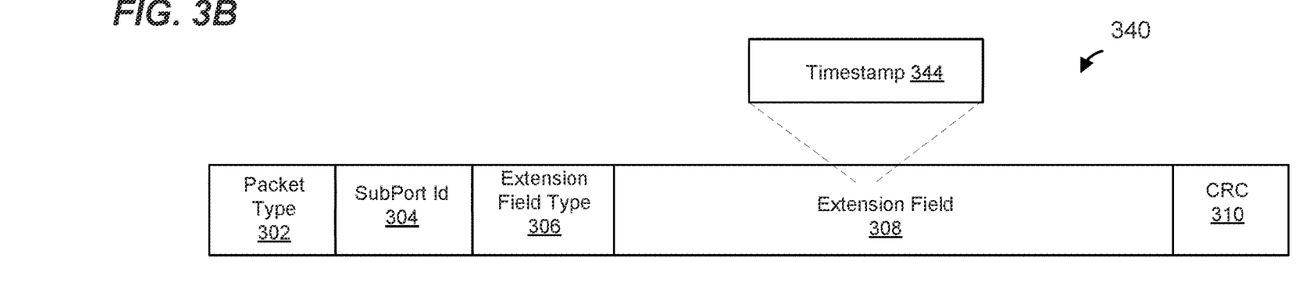

FIG. 3B is a simplified diagram of another example control header 340 that is included in a timing packet, according to another embodiment. The control header 340 is similar to the example control header 300 of FIG. 3A and like-numbered elements are not described in detail for purpose of brevity. In an embodiment, the control header 340 is the control header 300 after the control header 300 has been modified.

The control header 340 is generated by a PHY processor 108 (e.g., the PHY processor 108-1) for a timing packet that is received by the PHY processor 108 via a network link 106, according to an embodiment. In an embodiment, a PHY processor (e.g., the PHY processor 108-1) is configured to generate the control header 340 for a timing packet received via a network link 106, and to insert the control header 340 at a predetermined location within the timing packet. For example, the PHY processor 108-1 is configured to replace, with the control header 340, a preamble at a beginning of the timing packet.

The PHY processor 108-1 is configured to include, in the extension field 308 of the control header 340, a timestamp 344 corresponding to a receipt time of the packet. The PHY processor 108-1 is also configured to set the value of the extension field type field 306 to indicate that the extension field 308 includes a timestamp. In an embodiment, the timestamp 344 included in the extension field 308 occupies 32 bits of the extension field 308. In another embodiment, the timestamp 344 included in the extension field 308 occupies a suitable number of bits different from 32 bits (e.g., 16 bits, 48 bits, 64 bits or any other suitable number of bits). In an embodiment, the PHY processor 108-1 is configured to include the timestamp as a 32-bit unsigned value, in nanoseconds, of the PHY clock 113 at the time of receipt of the packet. In another embodiment, the PHY processor 108-1 is configured to include in the control header 340 a timestamp having another suitable format. For example, timestamp is in an IEEE time application interface (TAI) format, with a 2-bit seconds value followed by a 30-bit nanoseconds value, in an embodiment.

The MAC processor 118 is configured to receive the timing packet, with the control header 340, from the PHY processor 108-1, and to obtain the timestamp 344 from the extension field 308 of the control header 340. In an embodiment, the MAC processor 118 is configured to pass the timestamp value, in a suitable format, to the host processor 120. In an embodiment, the MAC processor 118 is configured to convert the timestamp value to a format suitable for transfer to the host processor 120. In some embodiments, the MAC processor 118 is configured to modify the timestamp value, for example to subtract an ingress pipeline delay from the timestamp value, and to transfer the modified timestamp value to the host processor 120. In an embodiment, the MAC processor 118 is configured to generate a timestamp tag (TST) for the packet to include the timestamp value in the timestamp value, in the suitable format, and to pass the timestamp tag to the host processor 120 along with the packet. In an embodiment, the host processor 120 is configured to utilize the timestamp 344 obtained from the control header 340 for synchronization with a master clock. In another embodiment, the MAC processor 118 is configured to internally utilize the timestamp 344 obtained from the control header 300, for example to update a correction field in the timing packet 152 to reflect a residence time of the timing packet 152 as described above.

Figure 3C:
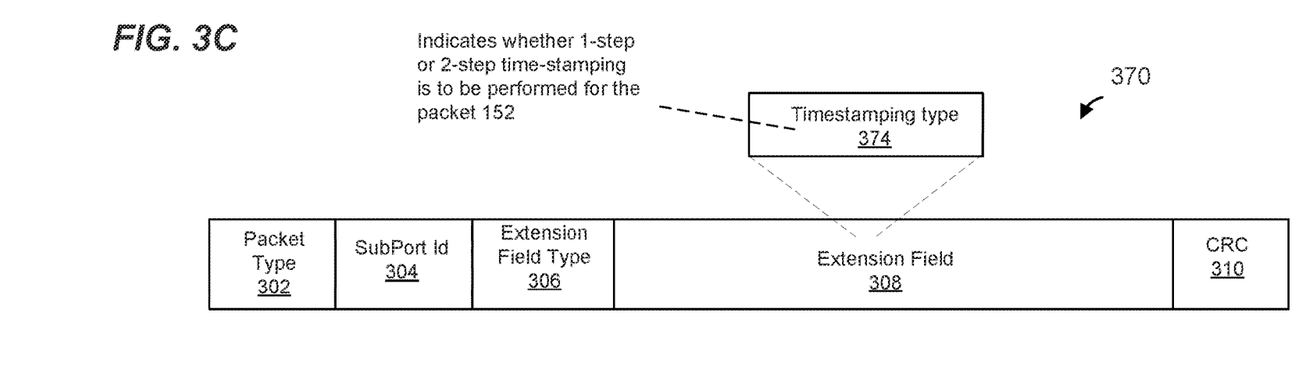

FIG. 3C is a simplified diagram of another example control header 370 that is included in a timing packet, according to another embodiment. The control header 340 is similar to the example control header 300 of FIG. 3A and the example control header 340 of FIG. 3B, and like-numbered elements are not described in detail for purpose of brevity. In an embodiment, the control header 370 is generated to have the format illustrated in FIG. 3C. In another embodiment, the control header 370 is the control header 300 after the control header 300 has been modified. In another embodiment, the control header 370 is the control header 340 after the control header 340 has been modified.

Referring to FIG. 1, the MAC processor 118 is configured to insert the control header 370 into a timing packet corresponding to a timing message received from the host processor 120 prior to transferring the timing packet to a PHY processor (e.g., the PHY processor 108-2) for transmission of the timing packet via a network port 104 (e.g., the network port 104-2), in an embodiment. In an embodiment, the control header 370 is inserted into the timing packet at a predetermined location within the timing packet. For example, the control header 370 replaces a preamble at a beginning of the timing packet, in an embodiment. In another embodiment, the MAC processor 118 is configured to modify a control header (e.g., the control header 300 or the control header 340) already present in the timing packet to generate the control header 370. For example, the MAC processor 118 is configured to modify the control header 300 or the control header 340 of a timing packet received from a PHY processor (e.g., the PHY processor 108-1) to generate the control header 370 prior to transferring the timing packet to another PHY processor (e.g., the PHY processor 108-2) for transmission of the timing packet via a network port 104 (e.g., the network port 104-2), in an embodiment.

The extension field 308 of the control field 370 is generated, or modified, to include a timestamping type field 374, in an embodiment. In an embodiment, the MAC processor 118 is configured to generate the control header 370 having the timestamping type field 374 for a timing message received from the host processor 120, and to append the control header 370 to the timing message. In another embodiment, the MAC processor 118 is configured to generate the timestamping type field 374 for a timing message already appended with the control header 300 or the control header 340 when received from the host processor 120 or from a PHY processor 108, and to insert the timestamping type field 374 in the extension field 308.

The timestamping type field 374 includes information that indicates whether the timing packet 152 is to be processed using one-step timestamping or using two-step timestamping, in an embodiment. For example, the header alteration engine 164 (FIG. 1) is configured to generate the timestamping type field 374 to include a value that indicates whether the timing packet is to be processed using one-step timestamping or using two-step timestamping. In an embodiment, the header alteration engine 164 sets the timestamping type field 374 to a first value to indicate that the timing packet is to be processed using one-step timestamping and sets the timestamping type field 374 to a second value to indicate that the timing packet is to be processed using two-step timestamping.

In an embodiment, the MAC processor 118 is also configured to include, in the packet type field 302 of the control header 370, an indicator indicating that the timing packet is a type of packet for which any type of timestamping by the PHY processor is to be performed. For example, for one or more packet types, the PHY processor 108-2 will not perform any timestamping, e.g., will not perform one-step timestamping and will not perform two-step timestamping. In an embodiment, when the PHY processor determines (e.g., the timestamping controller 124 determines), based on a value of the packet type field 302, that timestamping is to be performed, the PHY processor is configured to determine, based on information in the timestamping type field 374, whether one-step timestamping or two-step timestamping is to be performed. The PHY processor 108-2 is configured to perform embedding of timing information into the timing packet in response to i) determining, based on the packet type field 302, that the timing packet is a type of packet for which timestamping is to be performed, and ii) determining, based on information in the timestamping type field 374, that one-step timestamping is to be performed, in an embodiment. The PHY processor 108-2 is configured to store timing information in the memory 115 in response to i) determining, based on the packet type field 302, that the timing packet is a type of packet for which timestamping is to be performed, and ii) determining, based on information in the timestamping type field 374, that two-step timestamping is to be performed, in an embodiment.

The MAC processor 118 is configured to, when one-step timestamping is to be performed, generate the extension field 308 to include one or more indicators of one or more parameters needed by the PHY processor 108-2 to embed timing information into the packet, the timing information indicating a time corresponding to transmission of the packet from the network device 100 or the residence time of the timing packet in the network device 100.

The MAC processor 118 is configured to, when two-step timestamping is to be performed, generate the extension field 308 to include a subfield that includes identifier information (e.g., a "signature") that identifies the timing packet to facilitate subsequent matching of the timing packet with a transmit timing information sent in a follow-up packet.

When the PHY processor 108-2 receives a timing packet having the control header 370, the PHY processor 108-2 is configured to determine, at least by analyzing the packet type field 302, whether the PHY processor 108-2 is to perform timestamping for the timing packet, according to an embodiment. When the PHY processor 108-2 determines that timestamping is to be performed for the timing packet, the PHY processor 108-2 is configured to determine, at least by analyzing the timestamping type field 374, whether the PHY processor 108-2 is to perform one-step timestamping or two-step timestamping for the timing packet.

When the PHY processor 108-2 determines that one-step timestamping is to be performed for the timing packet, the PHY processor 108-2 is configured to obtain, from the control header 370 (e.g., from the extension field 308), one or more indicators for embedding timing information into the timing packet. For example, the PHY processor 108-2 is configured to obtain, from the control header 370 (e.g., from the extension field 308), an indication of a location within the timing packet at which to write timing information into the timing packet, according to an embodiment. The PHY processor 108-2 is configured to write timing information into the timing packet (e.g., at the determined location), the timing information indicating a time corresponding to transmission of the packet from the network device 100 and/or the residence time of the timing packet in the network device 100.

When the PHY processor 108-2 determines that two-step timestamping is to be performed for the timing packet, the PHY processor 108-2 is configured to obtain, from the control header 370 (e.g., from the extension field 308), the signature. The PHY processor 108-2 is configured to write timing information into the memory 115 in association with the signature, the timing information indicating a time corresponding to transmission of the packet from the network device 100 and/or the residence time of the timing packet in the network device 100. In an embodiment, writing timing information into the memory 115 in association with the signature comprises writing timing information and the signature into the memory 115 in a same memory location, or in different memory locations that are associated with one another. Writing the timing information into the memory 115 in association with the signature allows the host processor 120, to subsequently determine to which packet the timing information corresponds.

The header alteration engine 164 of the MAC processor 118 is implemented using hardware circuitry, a processor that executes machine readable instructions, or a suitable combination of hardware circuitry and a processor that executes machine readable instructions. In an embodiment, the header alteration engine 164 is implemented using a hardware state machine that is configured to perform acts such as described above.

The timestamping controller 124 of the PHY processor 108-2 is implemented using hardware circuitry, a processor that executes machine readable instructions, or a suitable combination of hardware circuitry and a processor that executes machine readable instructions. In an embodiment, the timestamping controller 124 is implemented using a hardware state machine that is configured to perform acts such as described above, according to an embodiment. The egress timestamping engine 110 and the ingress timestamping engine 112 of the PHY processor 108-2 are implemented using hardware circuitry, one or more processors that execute machine readable instructions, or a suitable combination of hardware circuitry and one or more processors that execute machine readable instructions. In an embodiment, the egress timestamping engine 110 and the ingress timestamping engine 112 are implemented using respective hardware state machines that are configured to perform acts such as described above, according to an embodiment.

Figure 4:
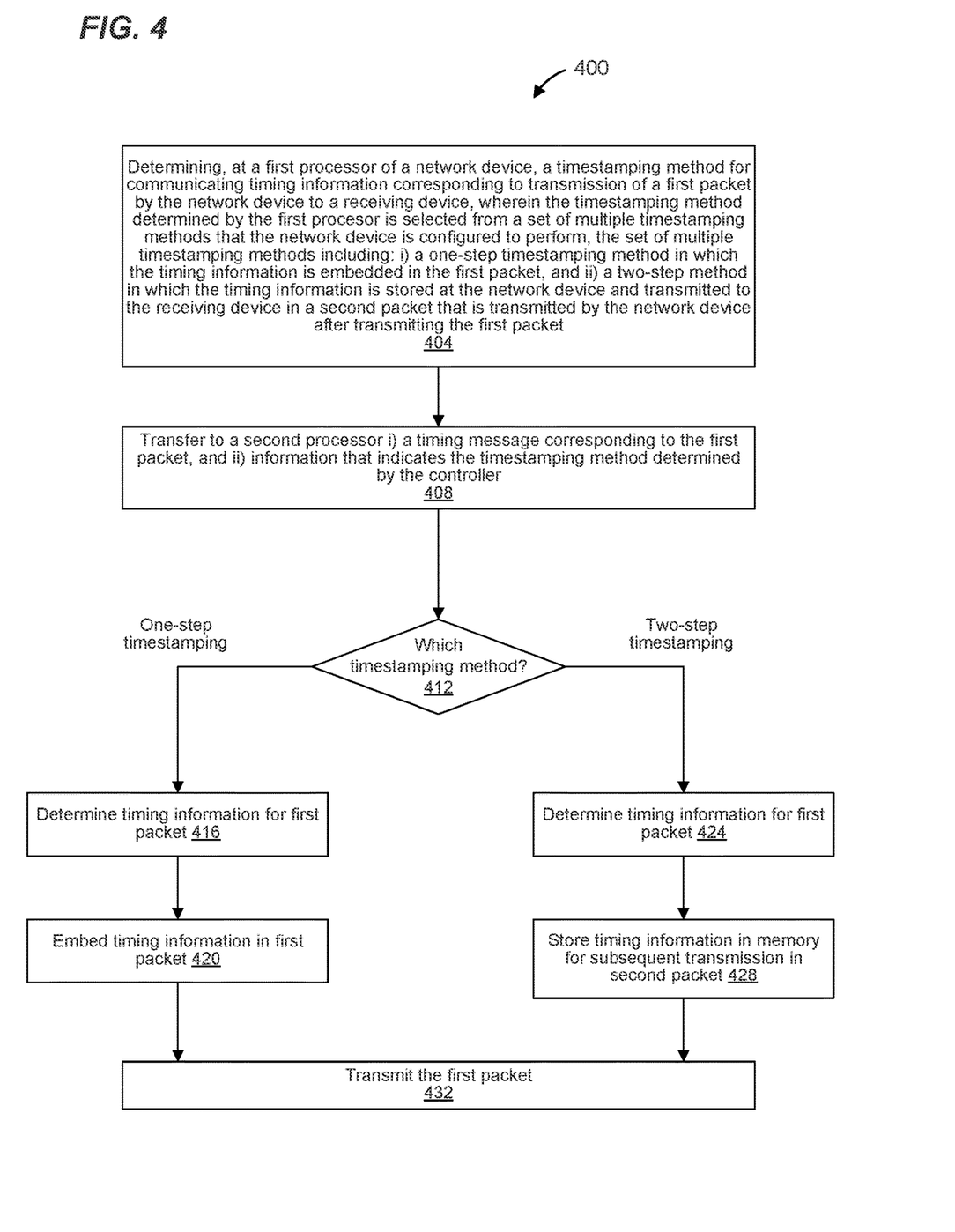
FIG. 4 is a flow diagram of an example method for processing packets in a network device, according to an embodiment.

FIG. 4 is a flow diagram of an example method 400 for processing timing packets in a network device, according to an embodiment. In an embodiment, the network device 100 of FIG. 1 implements the method 500, and the method 500 is described with reference to the network device 100 of FIG. 1 merely for ease of explanation. In other embodiments, the method 500 is implemented by a suitable network device different from the network device 100 of FIG. 1.

At block 404, a first processor of the network device determines a timestamping method for communicating timing information corresponding to transmission of a first packet by the network device to a receiving device. The timestamping method determined by the first processor at block 404 is selected from a set of multiple timestamping methods that a second processor of the network device is configured to perform, the set of multiple timestamping methods including: i) a one-step timestamping method, and ii) a two-step method. The one-step timestamping method involves the network device embedding the timing information in the first packet, whereas the two-step method involves the network device storing the timing information in a memory of the network device so that the network device can subsequently transmit the timing information to the receiving device in a second packet after transmitting the first packet.

In an embodiment, the network device is configured to transmit timing messages of multiple different types, and the determining the timestamping method at block 404 comprises determining the timestamping method based on a type of timing message corresponding to the first packet (e.g., include in, or to be included in, the first packet). For example, the multiple different types include a first set of one or more types and a second set of one or more types, in an illustrative embodiment. In some such embodiments, the first processor determines the timestamping method at block 404 as the one-step timestamping method when a type of the timing message corresponding to the first packet is from the first set of one or more types, and the first processor determines the timestamping method at block 404 as the two-step timestamping method when the type of the timing message corresponding to the first packet is from the second set of one or more types.

In an embodiment, determining the timestamping method at block 404 comprises the timing controller 126 of the host processor 120 determining the timestamping method. In another embodiment, determining the timestamping method at block 404 comprises the timing controller 162 of the MAC processor 118 determining the timestamping method. In other embodiments, another suitable processor determines the timestamping method at block 404.

At block 408, the first processor transfers to a second processor i) the timing message corresponding to the first packet, and ii) information that indicates the timestamping method determined by the controller. In an embodiment, transferring the timing message at block 408 comprises transferring to the timestamping engine the first packet, which includes the timing message.

In an embodiment, transferring at block 408 comprises the host processor 120 transferring i) the timing message corresponding to the first packet, and ii) information that indicates the timestamping method, to the MAC processor 118. In another embodiment, transferring at block 408 additionally or alternatively comprises the MAC processor 118 transferring i) the first packet, which includes the timing message, and ii) information that indicates the timestamping method, to the PHY processor 108.

At block 412, the second processor processes the information that indicates the timestamping method received at block 408 to determine which timestamping method is to be performed by the second processor. When the second processor determines that one-step timestamping is to be performed, the flow proceeds to block 416.

In an embodiment, the first processor generates a control header that includes the information that indicates the timestamping method, and inserts the control header in the first packet prior to transferring the first packet from the first processor to the second processor; and determining which timestamping method is to be performed by the second processor at block 412 comprises the second processor analyzing the control header to determine which timestamping method is to be performed by the second processor.

At block 416, the second processor determines the timing information corresponding to the transmission of the first packet by the network device to the receiving device. For example, the second processor uses a clock (e.g., the PHY clock 113 or another suitable clock) to determine the timing information at block 416.

At block 420, the second processor embeds the timing information in the first packet. In an embodiment, the timing message includes a timestamp field, and embedding the timing information in the first packet at block 420 comprises embedding the timing information in a correction field of the timing message, the correction field being distinct from the timestamp field. For example, the PHY processor 108-1 embeds the timing information in the correction field 206 (FIG. 2), whereas a timestamp is stored in the timestamp field 208. In an embodiment, a value of the timestamp field is determined based on a first clock of the network device (e.g., the host clock 128), whereas the timing information in the correction field is determined based on a second clock of the network device (e.g., the PHY clock 113).

On the other hand, when the second processor determines at block 412 that two-step timestamping is to be performed, the flow proceeds to block 424. At block 424, the second processor determines the timing information corresponding to the transmission of the first packet by the network device to the receiving device. For example, the second processor uses a clock to determine the timing information at block 424. In an embodiment, the timing information is determined at block 424 based on a clock of the network device (e.g., the PHY clock 113).

At block 428, the second processor stores the timing information in a memory of the network device for subsequent inclusion in a second packet that is to be transmitted by the network device after transmitting the first packet.

At block 432, the network device transmits the first packet from the network device to the receiving device. In some embodiments in which a control header is inserted or appended to the first packet, the network device removes the control header from the packet so that when the first packet is transmitted at block 432 the first packet does not include the control header.

In an embodiment, determining the timing information at block 416 and determining the timing information at block 424 is implemented as a single act that is performed without regard to whether one-step timestamping is performed or two-step timestamping is performed.

In an embodiment, the timing message is received by the first processor from a third processor (e.g., the host processor 120), and the first processor generates the first packet at least by encapsulating the timing message with one or more communication protocol headers.

In an embodiment: transferring i) the timing message, and ii) the information that indicates the timestamping method at block 408 comprises: transferring i) the timing message, and ii) the information that indicates the timestamping method from a MAC processor of the network device (e.g., the MAC processor 118) to a PHY processor of the network device (e.g., the PHY processor 108-1; determining which timestamping method is to be performed at block 412 comprises the PHY processor determining which timestamping method is to be performed by the PHY processor based on the PHY processor analyzing the information that indicates the timestamping method; embedding the timing information in the first packet at block 420 is performed by the PHY processor in response to the PHY processor determining that the one-step method is to be performed by the PHY processor; and storing the timing information in the memory at block 428 is performed by the PHY processor in response to the PHY processor determining that the timestamping method is to be performed by the PHY processor.

In some embodiments in which the one-step timestamping method includes a future timestamping technique, blocks 416 and 420 are replaced by: the network device holding the first packet until a current time reaches the transmit time, and then releasing the first packet for transmission at the transmit time.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device configured to operate in a communication network, the network device comprising:
a first processor configured to:
determine a timestamping method for communicating timing information corresponding to transmission of a first packet by the network device to a receiving device, wherein the timestamping method determined by the controller is selected from a set of multiple timestamping methods that a second processor of the network device is configured to perform, the set of multiple timestamping methods including: i) a one-step timestamping method, and ii) a two-step timestamping method, and
transfer, to the second processor of the network device, i) a timing message corresponding to the first packet, and ii) information that indicates the timestamping method determined by the first processor, wherein when the timestamping method is the one-step method, the timing message includes a timestamp that is set using a first clock circuit, the timestamp indicative of a time of transmission of the first packet by the network device;
a memory included in, or coupled to the second processor; and
the second processor, being configured to: determine which timestamping method is to be performed by the second processor based on analyzing the information that indicates the timestamping method determined by the first processor, the second processor having a timestamping engine configured to:
determine additional timing information corresponding to the transmission of the first packet by the network device to the receiving device using a second clock circuit different than the first clock circuit,
in response to the second processor determining that the timestamping method is the one-step method, embed the additional timing information in the first packet, and
in response to the second processor determining that the timestamping method is the two-step method, store the additional timing information in the memory for subsequent inclusion in a second packet that is to be transmitted by the network device after transmitting the first packet;
the second processor being further configured to transmit the first packet from the network device, the first packet having, when the timestamping method is the one-step method, i) the timestamp set using the first clock circuit and ii) the additional timing information determined using the second clock circuit.

2. The network device of claim 1, wherein:
the network device is configured to transmit timing messages of multiple different types; and
the first processor is configured to determine the timestamping method based on a type of timing message corresponding to the first packet.

3. The network device of claim 2, wherein:
the multiple different types includes a first set of one or more types and a second set of one or more types; and
the first processor is configured to determine the timestamping method as the one-step timestamping method when a type of the timing message corresponding to the first packet is from the first set of one or more types; and
the first processor is configured to determine the timestamping method as the two-step timestamping method when the type of the timing message corresponding to the first packet is from the second set of one or more types.

4. The network device of claim 1, wherein:
the first processor comprises a media access control (MAC) processor; and
the second processor comprises a physical layer (PHY) processor.

5. The network device of claim 1, wherein:
the first processor is configured to transfer the first packet from the first processor to the second processor, the first packet including i) the timing message, and ii) the information that indicates the timestamping method.

6. The network device of claim 5, wherein:
the first processor is configured to generate a control header that includes the information that indicates the timestamping method, and insert the control header in the first packet prior to transferring the first packet from the first processor to the second processor; and
the second processor is configured to determine which timestamping method is to be performed by the second processor at least by analyzing the information that indicates the timestamping method within the control header.

7. The network device of claim 6, wherein:
the first processor is configured to generate the control header to include an extension field that includes the information that indicates the timestamping method; and
the second processor is configured to determine which timestamping method is to be performed by the second processor at least by analyzing the information that indicates the timestamping method within the extension field of the control header.

8. The network device of claim 5, further comprising:
a third processor that is configured to transfer the timing message to the first processor;
wherein the first processor is configured to generate the first packet at least by encapsulating the timing message received from the third processor with one or more communication protocol headers.

9. The network device of claim 1, wherein, when the timestamping method is the one-step method:
the timing message includes a timestamp field that includes the timestamp that was set using the first clock circuit; and
the second processor is configured to embed the additional timing information in a correction field of the timing message, the correction field being distinct from the timestamp field.

10. The network device of claim 9, wherein:
the network device is configured to set the timestamp field based on a first clock of the network device when the timestamping method is the one-step method.

11. A method for processing timing packets in a network device, the method comprising:
determining, at a first processor of the network device, a timestamping method for communicating timing information corresponding to transmission of a first packet by the network device to a receiving device, wherein the timestamping method determined by the controller is selected from a set of multiple timestamping methods that a second processor of the network device is configured to perform, the set of multiple timestamping methods including: i) a one-step timestamping method, and ii) a two-step timestamping method;

transferring, from the first processor to the second processor of the network device, i) a timing message corresponding to the first packet, and ii) information that indicates the timestamping method determined by the first processor, wherein when the timestamping method is the one-step method, transferring the timing message comprises transferring the timing message that includes a timestamp set using a first clock circuit of the network device, the timestamp indicative of a time of transmission of the first packet by the network device;

determining, at the second processor, which timestamping method is to be performed by the second processor based on analyzing the information that indicates the timestamping method determined by the first processor;

determining, at the second processor and using a second clock circuit different than the first clock circuit, additional timing information corresponding to the transmission of the first packet by the network device to the receiving device;

in response to determining, at the second processor, that the timestamping method is the one-step method, embedding, at the second processor, the additional timing information in the first packet;

in response to determining, at the second processor, that the timestamping method is the two-step method, storing the additional timing information in a memory of the network device for subsequent inclusion in a second packet that is to be transmitted by the network device after transmitting the first packet; and transmitting the first packet from the network device, the first packet having, when the timestamping method is the one-step method, i) the timestamp set using the first clock circuit and ii) the additional timing information determined using the second clock circuit.

12. The method for processing timing packets of claim 11, wherein:
the network device is configured to transmit timing messages of multiple different types; and
determining the timestamping method for communicating timing information corresponding to transmission of the first packet comprises determining the timestamping method based on a type of timing message corresponding to the first packet.

13. The method for processing timing packets of claim 12, wherein:
the multiple different types includes a first set of one or more types and a second set of one or more types; and
determining the timestamping method for communicating timing information corresponding to transmission of the first packet comprises determining the timestamping method as the one-step timestamping method when a type of the timing message corresponding to the first packet is from the first set of one or more types; and
determining the timestamping method for communicating timing information corresponding to transmission of the first packet comprises determining the timestamping method as the two-step timestamping method when the type of the timing message corresponding to the first packet is from the second set of one or more types.

14. The method for processing timing packets of claim 11, wherein:
transferring i) the timing message, and ii) the information that indicates the timestamping method comprises: transferring i) the timing message, and ii) the information that indicates the timestamping method from a media access control (MAC) processor of the network device to a physical layer (PHY) processor of th network device;
determining which timestamping method is to be performed, comprises the PHY processor determining which timestamping method is to be performed by the PHY processor based on the PHY processor analyzing the information that indicates the timestamping method;
embedding the additional timing information in the first packet is performed by the PHY processor in response to the PHY processor determining that the one-step method is to be performed by the PHY processor; and
storing the additional timing information in the memory is performed by the PHY processor in response to the PHY processor determining that the timestamping method is to be performed by the PHY processor.

15. The method for processing timing packets of claim 11, further comprising:
transferring the first packet from the first processor to the second processor, the first packet including i) the timing message, and ii) the information that indicates the timestamping method;
wherein transferring i) the timing message, and ii) the information that indicates the timestamping method comprises transferring i) the timing message, and ii) the information that indicates the timestamping method within the first packet.

16. The method for processing timing packets of claim 15, further comprising:
generating, at the first processor, a control header that includes the information that indicates the timestamping method; and
inserting, by the first processor, the control header in the first packet prior to transferring the first packet from the first processor to the second processor;
wherein determining which timestamping method is to be performed by the second processor comprises analyzing, by the second processor, the control header to determine which timestamping method is to be performed by the second processor.

17. The method for processing timing packets of claim 16, wherein:
generating the control header comprises generating an extension field of the control header to include the information that indicates the timestamping method; and
analyzing, by the second processor, the control header to determine which timestamping method is to be performed by the second processor comprises analyzing, by the second processor, the extension field of the control header to determine which timestamping method is to be performed by the second processor.

18. The method for processing timing packets of claim 15, further comprising:
receiving, at the first processor, the timing message from a third processor;
generating, at the first processor, the first packet at least by encapsulating the timing message with one or more communication protocol headers.

19. The method for processing timing packets of claim 11, wherein, when the timestamping method is the one-step method:
the timing message includes a timestamp field having the timestamp that was set using the first clock circuit; and
embedding the additional timing information in the first packet comprises embedding the additional timing information in a correction field of the timing message, the correction field being distinct from the timestamp field.

20. The method for processing timing packets of claim 18, further comprising, when the timestamping method is the one-step method:
   setting, by the network device, the timestamp field based on the first clock circuit of the network device.

* * * * *